(12) United States Patent
Sakurai

(10) Patent No.: US 7,366,828 B2
(45) Date of Patent: Apr. 29, 2008

(54) MEMORY CONTROLLER, SEMICONDUCTOR INTEGRATED CIRCUIT DEVICE, SEMICONDUCTOR DEVICE, MICROCOMPUTER, AND ELECTRONIC DEVICE

(75) Inventor: Mikio Sakurai, Iharaki (JP)

(73) Assignee: Seiko Epson Corporation (JP)

( * ) Notice: Subject to any disclaimer, the term of this patent is extended or adjusted under 35 U.S.C. 154(b) by 317 days.

(21) Appl. No.: 11/100,228

(22) Filed: Apr. 6, 2005

(65) Prior Publication Data
US 2005/0235101 A1 Oct. 20, 2005

(30) Foreign Application Priority Data
Apr. 20, 2004 (JP) ............................. 2004-124386

(51) Int. Cl.
*G06F 12/00* (2006.01)
(52) U.S. Cl. .................. 711/106; 711/150; 711/167; 711/168
(58) Field of Classification Search ................ 711/106, 711/167, 168, 150; 365/222
See application file for complete search history.

(56) References Cited

U.S. PATENT DOCUMENTS 5,907,857 A * 5/1999 Biswas ..................... 711/106
6,336,166 B1 * 1/2002 Kelly ........................ 711/118
6,513,094 B1 * 1/2003 Magro ....................... 711/103
6,941,415 B1 * 9/2005 Ryan ......................... 711/106
7,043,599 B1 * 5/2006 Ware et al. ................ 711/106

FOREIGN PATENT DOCUMENTS

JP 2002-269980 * 9/2002

* cited by examiner

*Primary Examiner*—Donald Sparks
*Assistant Examiner*—Alan M Otto
(74) *Attorney, Agent, or Firm*—Harness, Dickey & Pierce, P.L.C.

(57) ABSTRACT

A memory controller is connected with a first memory requiring refresh and a second memory not requiring refresh, both of which share part of a bus, comprising: a first memory controller that conducts access control and auto-refresh control for the first memory; a second memory controller that conducts access control for the second memory; and an arbiter that adjusts the timing of outputting a signal generated for the first memory and another signal generated for the second memory to a bus, wherein, with a judgment that the signal from the first memory controller is an auto-refresh request, a refresh request signal for the first memory is outputted even while the second memory is being accessed.

12 Claims, 9 Drawing Sheets

MEMORY CONTROLLER, SEMICONDUCTOR INTEGRATED CIRCUIT DEVICE, SEMICONDUCTOR DEVICE, MICROCOMPUTER, AND ELECTRONIC DEVICE

RELATED APPLICATIONS

This application claims priority to Japanese Patent Application No. 2004-124386 filed Apr. 20, 2004 which is hereby expressly incorporated by reference herein in its entirety.

BACKGROUND

1. Technical Field

The present invention relates to a memory controller, a semiconductor integrated circuit device, a semiconductor device, a microcomputer, and an electronic device.

2. Related Art

Dynamic random access memory (DRAM) and a synchronous DRAM (SDRAM) require a periodic refresh. The SDRAM (DRAM) is a storing medium for recording data of input/output (I/O) depending on the presence of electric charge. Since electric charge is lost with time, recorded data needs to be refreshed periodically. The SDRAM (DRAM) has a simpler memory configuration compared to a SRAM and is suitable for larger capacity. Therefore, there is a case where a system requiring a relatively large memory capacity is configured using an SDRAM or both a flash memory and an SDRAM.

Here, when an SDRAM and an SRAM are used, there is a case where the two have a shared bus. In such a case, simultaneous access to the SDRAM and the SRAM is impossible because the two share a data bus and an address bus.

However, since the SDRAM requires periodic refresh, a request for refreshing the SDRAM may arise while the SRAM is accessed.

In such a case, there has been a problem that a refresh request arising during access to the SRAM is put into a waiting state until the access is completed and, on the other hand, a request for accessing the SRAM arising during refresh of the SDRAM is put into a waiting state until the refresh is completed.

There has been another problem that, in a configuration having priority in refreshing the SDRAM, access to the SDRAM is interrupted, leading to a degradation of system performance such as a reduction of data transfer rate, etc.

The present invention has been developed, taking the above problems into consideration, and aims to provide a memory controller, which enables the execution of refresh of the first memory even while the second memory is being accessed in a system configuration wherein the first memory requiring refresh and the second memory not requiring refresh share part of a bus, as well as a semiconductor integrated circuit device, a semiconductor device, a microcomputer, and an electronic device.

SUMMARY

A memory controller according to the present invention that is connectable with a first memory, which requires refresh, and a second memory, which shares part of a bus with the first memory and does not require refresh, comprises: the first memory controller that conducts access control and auto-refresh control for the first memory; the second memory controller that conducts access control for the second memory; and an arbiter that adjusts the timing of outputting a signal that is generated for the first memory by the first memory controller and another signal that is generated for the second memory by the second memory controller to a bus that is connected to at least one of the first memory and the second memory, wherein the arbiter judges whether or not a signal from the first memory controller is an auto-refresh request signal and, if the signal is an auto-refresh request, controls the timing of outputting a refresh request signal for the first memory even while the second memory is being accessed.

The first memory requiring refresh includes, for example, SDRAMs, DRAMs, etc.

The second memory not requiring refresh includes SRAMs, ROMs, etc.

According to the present invention, refresh of the first memory can be carried out in the background of executing access to the second memory. Therefore, refresh of the first memory can be carried out in an appropriate timing. Further, a degradation of system performance such as a reduction of data transfer rate, etc. due to the interruption of reading or writing data of the second memory, etc. can be avoided.

In addition, the case where three or more memories including the first memory requiring refresh and the second memory not requiring refresh share a bus is also within the scope of the present invention.

In the memory controller according to the present invention, a bus that outputs a signal required for refresh control for the first memory is not shared with the second memory.

In the memory controller according to the present invention, a bus that outputs a chip select signal; a row address strobe (RAS) signal; a column address strobe (CAS) signal; and a write enable (WE) signal, which are used for auto-refresh control in the case where the first memory is a synchronous DRAM, is not shared with the second memory.

The row address strobe signal is represented as an RAS signal, and the column address strobe signal is represented as a CAS signal. Generally, in a synchronous DRAM (hereinafter referred to as SDRAM), an auto-refresh command is generated with a combination of a row address strobe (RAS) signal, a column address strobe (CAS) signal, and a write enable (WE) signal.

According to the present invention, a bus that outputs a chip select signal, a row address strobe (RAS) signal, a column address strobe (CAS) signal, and a write enable signal is not shared with the second memory. Therefore, an auto-refresh request for the first memory can be made in the background (in parallel) even while the second memory is using the bus (being accessed).

In the memory controller according to the present invention, the first memory and the second memory share a data bus and an address bus.

According to the present invention, memory control can be carried out with a small number of signal lines.

A semiconductor integrated circuit device according to the present invention comprises the memory controller in any of the above descriptions.

A semiconductor device according to the present invention comprises the memory controller in any of the above descriptions, the first memory, and the second memory.

A microcomputer according to the present invention comprises the memory controller in any of the above descriptions.

An electronic device according to the present invention comprises: the microcomputer in the above description; a means for inputting data to be processed by the microcomputer; and an LCD outputting means for outputting data processed by the microcomputer.

DETAILED DESCRIPTION

Memory Controller

Preferred embodiment of the present invention will now be described in detail with reference to the accompanying drawings.

Figure 4:
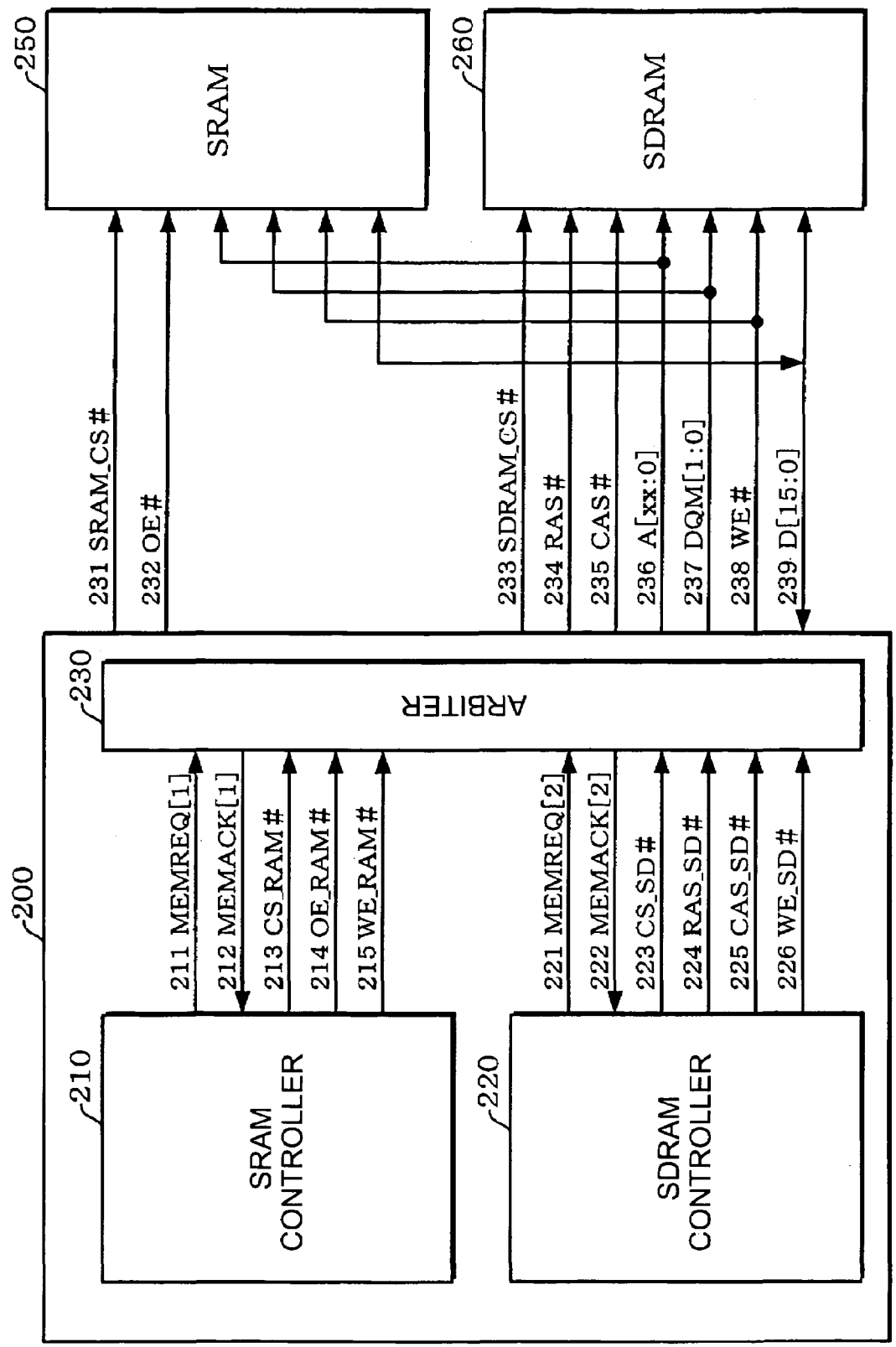
FIG. 4 is a drawing describing a comparative system example wherein a bus is shared by an SDRAM and an SRAM.

FIG. 4 is a drawing describing a comparative system example wherein a bus is shared by an SDRAM and an SRAM.

In the comparative system example, a memory controller 200 is connected with an SRAM 250 and an SDRAM 260, which share part of a control signal (write enable WE and data mask DQM), an address bus A, and a data bus D. The memory controller 200 comprises an SRAM controller 210, an SDRAM controller 220, and an arbiter 230.

The SRAM controller 210 conducts access control for the SRAM 250. Signals MEMREQ 211, CS_RAM 213, OE_RAM 214, and WE_RAM 215 are generated and outputted by the SRAM controller 210 in order to make an access request to the SRAM 250. The SRAM controller 210 conducts access control by generating an access request signal (command) to the SRAM 250 with a combination of the above signals.

The SDRAM controller 220 conducts access control and auto-refresh control for the SDRAM 260. Signals MEMREQ 221, CS_SD 223, RAS_SD 224, CAS_SD 225, and WE_SD 226 are generated and outputted by the SDRAM controller 220 in order to make an access request or an auto-refresh request to the SDRAM 260. The SDRAM controller 220 conducts access control or auto-refresh control by generating an access request signal (command) or an auto-refresh request signal (command) to the SDRAM 260 with a combination of the above signals.

The arbiter 230 receives an access request signal from the SRAM controller 210; and an access request signal or an auto-refresh control signal from the SDRAM controller 220, and controls the timing of outputting these signals to the bus.

Signals SRAM_CS 231, OE 232, SDRAM_CS 233, RAS 234, CAS 235, A 236, DQE 237, WE 238, and D239 are outputted by the arbiter 230 to the SRAM 250 or the SDRAM 260. Here, the bus is shared between the SRAM 250 and the SDRAM 260 for the signals of address; data mask; write enable; and data, each of which is numbered as A 236; DQE 237; WE 238; and D239.

Therefore, in the above system, simultaneous access to the SRAM 250 and the SDRAM 260 is impossible.

Figure 5:
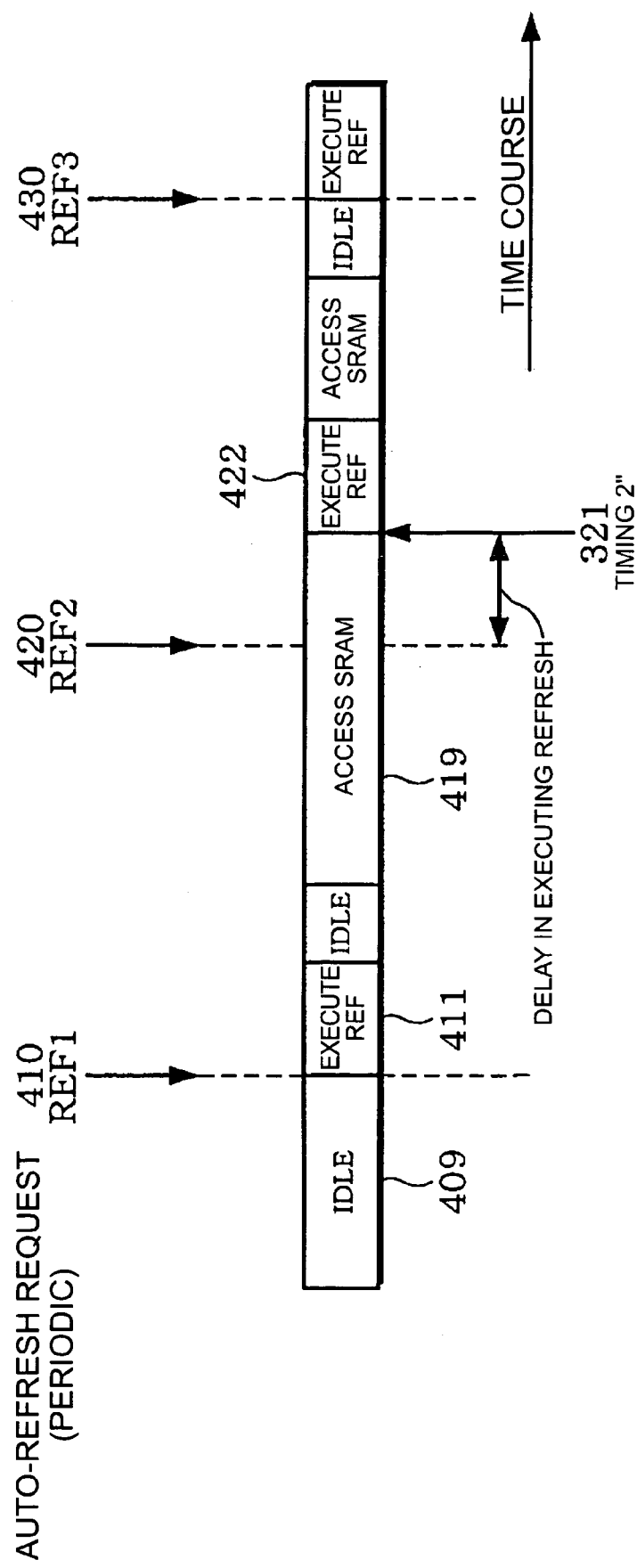
FIG. 5 is a drawing describing the refresh timing in a form of the comparative example.

FIG. 5 is a drawing describing the refresh timing in a form of the comparative example.

Reference numerals 410, 420, and 430 are the timings of auto-refresh that are generated by the SDRAM controller 220 at specified intervals. In an auto-refresh timing 1 (REF1) 410, the bus is in an IDLE state 409. Therefore, an auto-refresh request is made and a refresh 411 is executed. However, in an auto-refresh timing 2 (REF2) 420, the bus is used by the SRAM controller (419). Therefore, an auto-refresh request cannot be made and the execution of refresh is put into a waiting state until a timing 2″ (321), which causes a delay in executing refresh.

Figure 6:
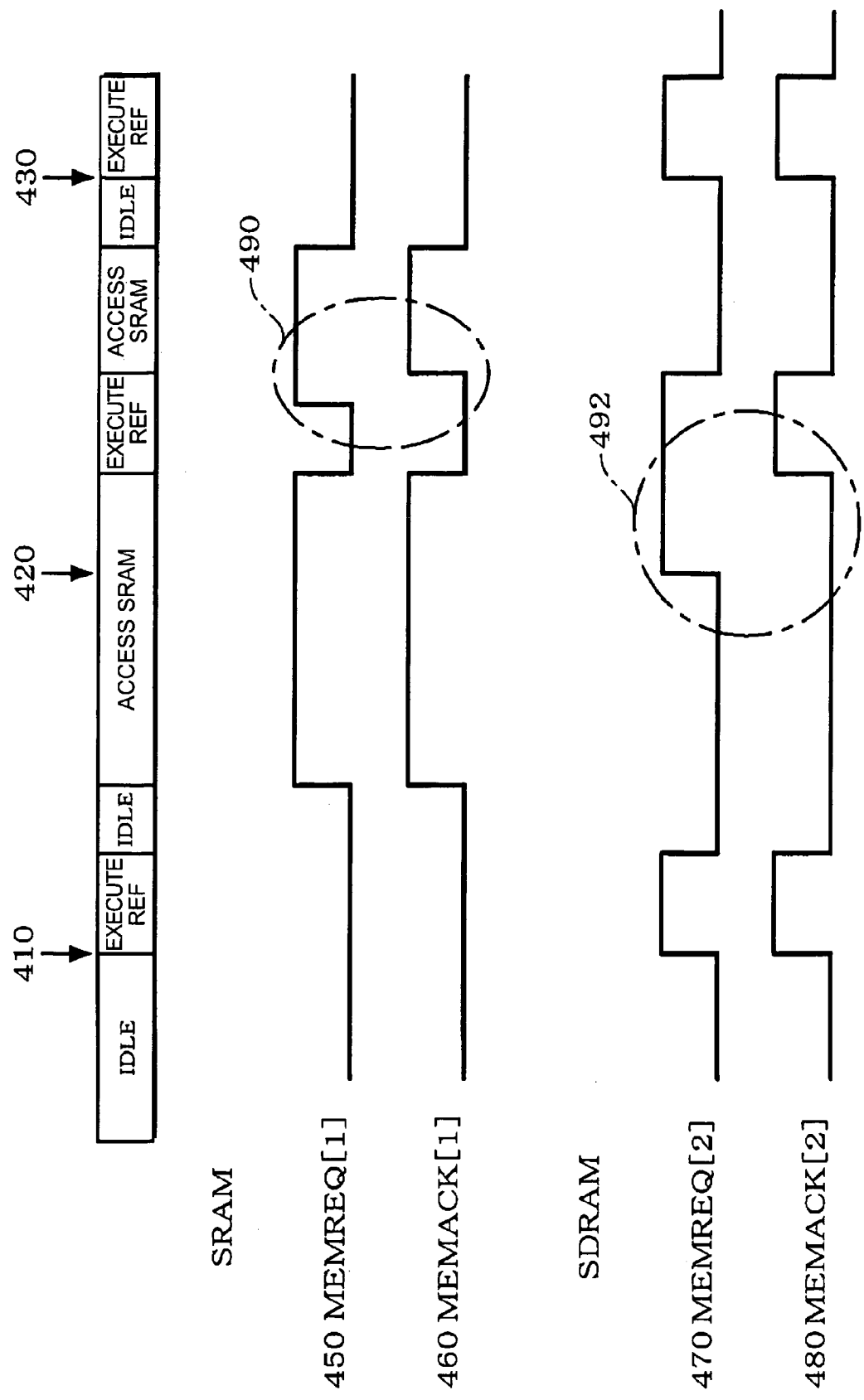
FIG. 6 is a drawing describing the behavior of the arbiter in the comparative example.

FIG. 6 is a drawing describing the behavior of the arbiter in the comparative example.

A reference numeral 450 is a memory request signal MEMREC (1) to the SRAM, and a reference numeral 460 is an enabling signal MEMACK (1) for the memory request signal MEMREC (1) to the SRAM.

Further, a reference numeral 470 is a memory request signal MEMREC (2) to the SDRAM, and a reference numeral 480 is an enabling signal MEMACK (2) for the memory request signal MEMREC (2) to the SDRAM.

As shown in 490, the bus is occupied by the SDRAM while the SDRAM is executing refresh. Therefore, although the SRAM controller makes an application for bus acquisition, the issuance of permission is kept in a waiting state.

Further, as shown in 492, the bus is occupied by the SRAM while the SRAM is executing access. Therefore, although the SDRAM controller makes an application for bus acquisition, the issuance of permission is kept in a waiting state.

As described above, in the comparative system example, when the timings of an auto-refresh request and an access request coincide with each other, one has to be kept waiting until the execution of the other is completed.

Figure 1:
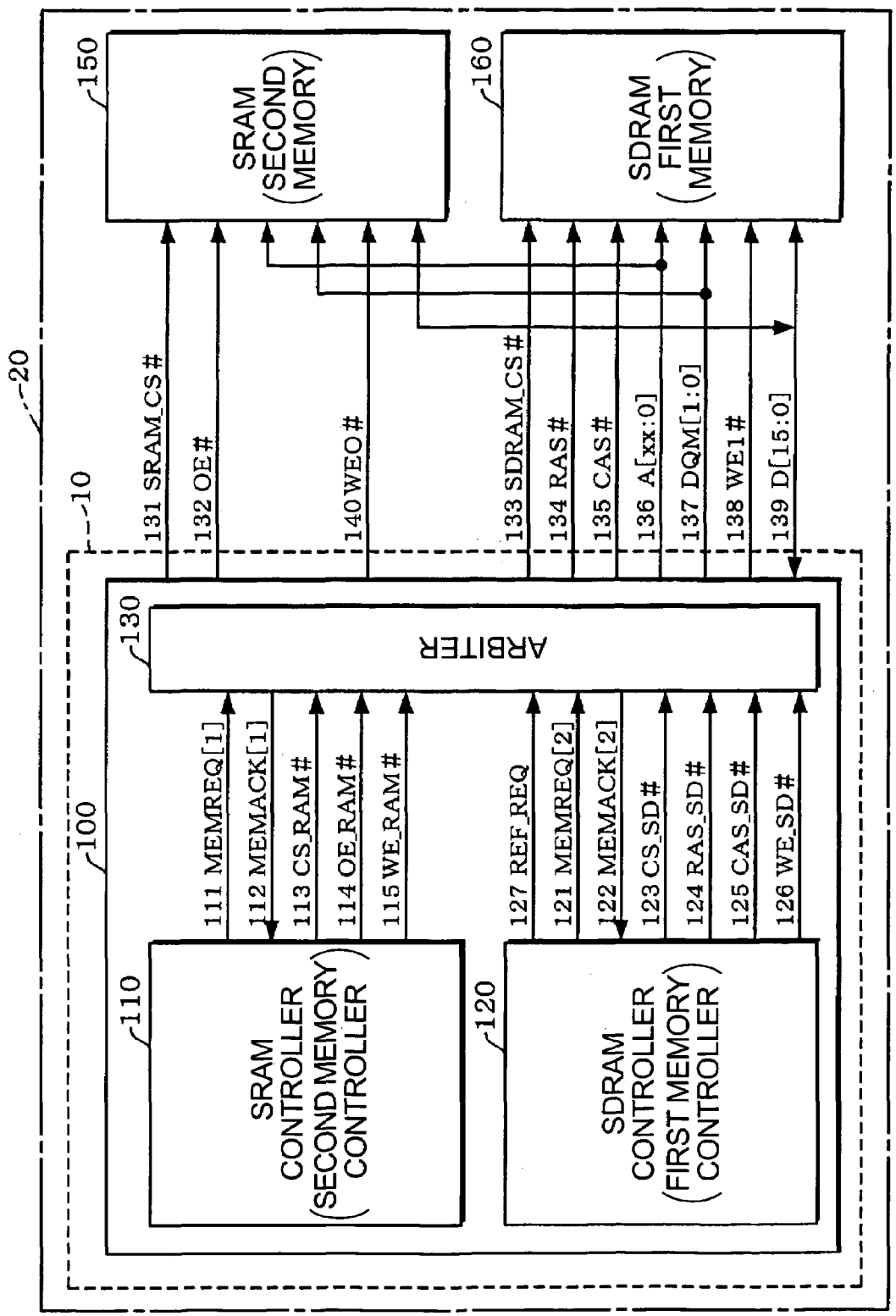
FIG. 1 is a drawing describing a memory controller according to the present embodiment, a semiconductor integrated circuit device, and a semiconductor device.

FIG. 1 is a drawing describing a memory controller according to the present embodiment, a semiconductor integrated circuit device, and a semiconductor device.

A reference numeral 100 is a memory controller of the present embodiment. A reference numeral 10 is a semiconductor integrated circuit device comprising the memory controller of the present embodiment. A reference numeral 20 is a semiconductor device comprising the memory controller of the present embodiment, the first memory, and the second memory.

In the memory controller 100 of the present embodiment, an SDRAM (the first memory) 160 that requires refresh and an SRAM (the second memory) 150 that does not require refresh are connected via a partly shared bus.

The memory controller 100 of the present embodiment comprises an SDRAM (the first memory) controller 120. The SDRAM (the first memory) controller 120 conducts access control and auto-refresh control for the SDRAM (the first memory) 160. Signals MEMREQ 121, CS_SD 123, RAS_SD 124, CAS_SD 125, and WE_SD 126 are generated and outputted by the SDRAM (the first memory) controller 120 in order to make an access request or an auto-refresh request to the SDRAM (the first memory) 160. The SDRAM (the first memory) controller 120 conducts access control or auto-refresh control by generating an access request signal (command) or an auto-refresh request signal (command) to the SDRAM (the first memory) 160 with a combination of the above signals.

In addition, a signal REF_REQ 127 is for reporting to an arbiter 130 that an auto-refresh request is to be made.

The memory controller 100 of the present embodiment comprises an SRAM (the second memory) controller 110. The SRAM (the second memory) controller 110 conducts access control for the SRAM (the second memory) 150. Signals MEMREQ 111, CS_RAM 113, OE_RAM 114, and WE_RAM 115 are generated and outputted by the SRAM (the second memory) controller 110 in order to make an access request to the SRAM (the second memory) 150. The SRAM (the second memory) controller 110 conducts access control by generating an access request signal (command) to the SRAM (the second memory) 150 with a combination of the above signals.

The memory controller 100 of the present embodiment comprises the arbiter 130. The arbiter 130 judges whether or not a signal from the SDRAM (the first memory) controller 120 is a refresh request signal and, if the signal is a refresh request, controls the timing of outputting a refresh request signal for the SDRAM (the first memory) even while the SRAM (the second memory) 150 is being accessed.

Here, the arbiter 130 can judge, based on the REF_REQ 127 from the SDRAM (the first memory) controller 120, whether or not the current request is an auto-refresh request.

More specifically, the arbiter 130 receives the signals REF_REQ 127, MEMREQ 121, CS_SD 123, RAS_SD 124, CAS_SD 125, and WE_SD 126 that are generated for the first memory by the SDRAM (the first memory) controller 120 and the signals MEMREQ 111, CS_RAM 113, OE_RAM 114, and WE_RAM 115 that are generated for the SRAM (the second memory) by the SRAM (the second memory) controller 110, and then adjusts the timing of outputting these signals to the bus connected to the SDRAM (the first memory) 160 and the SRAM (the second memory) 150.

Signals SRAM_CS 131, OE 132, SDRAM_CS 133, RAS 134, CAS 135, A136, DQE 137, WE 138, D 139, and WEO 140 are outputted for the SRAM (the second memory) 150 or the SDRAM (the first memory) 160 by the arbiter 130.

The SDRAM (the first memory) 160 and the SRAM (the second memory) 150 share the data buses DQE 137 and D 139, as well as the address bus A 136.

However, the buses SDRAM_CS 133, RAS 134, CAS 135, and WE 138 that are required for making a refresh request for the SDRAM (the first memory) 160 are not shared with the SRAM (the second memory) 150. An auto-refresh command is generated with a combination of the SDRAM_CS 133, RAS 134, CAS 135, and WE 138.

As described above, the arbiter 130 of the present embodiment judges, based on the REF_REQ 127, whether or not a request from the SDRAM (the first memory) controller 120 is a refresh request, and, if the request is a refresh request, permits the bus access during the bus access of the SRAM (the second memory) controller 110. Further, with a configuration wherein the write enable signal WEO 140 for the SRAM (the second memory) and the write enable signal WE1 for the SDRAM (the first memory) do not share the bus, refresh of the SDRAM (the first memory) 160 and access for reading/writing of the SRAM (the second memory) 150 can be executed simultaneously.

According to the present embodiment, refresh of the SDRAM (the first memory) 160 can be carried out in the background of executing access to the SRAM (the second memory) 150. Therefore, refresh can be carried out in an appropriate timing. Further, a degradation of system performance such as a reduction of data transfer rate, etc. due to the interruption of reading or writing data, etc. can be avoided.

Figure 2:
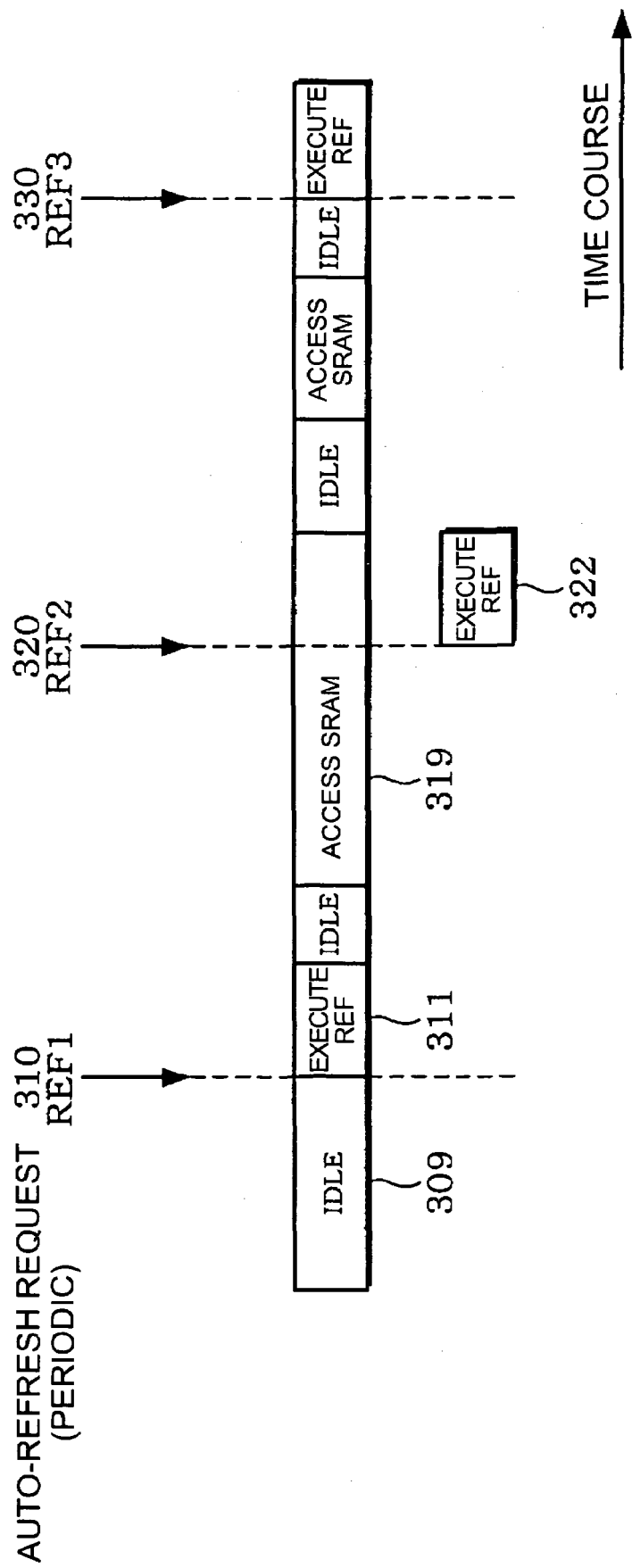
FIG. 2 is a drawing describing the refresh timing in the present embodiment.

FIG. 2 is a drawing describing the refresh timing in the present embodiment.

Reference numerals 310, 320, and 330 are the timings of auto-refresh that are generated by the SDRAM controller 120 at specified intervals. In an auto-refresh timing 1 (REF1) 310, the bus is in an IDLE state 309. Therefore, an auto-refresh request is made and a refresh 311 is executed.

Further, in an auto-refresh timing 2 (REF2) 320, an auto-refresh request is outputted, while the bus is being used by the SRAM controller (319). Then, a refresh 322 of the SDRAM is executed in the background of the SRAM access 319.

Figure 3:
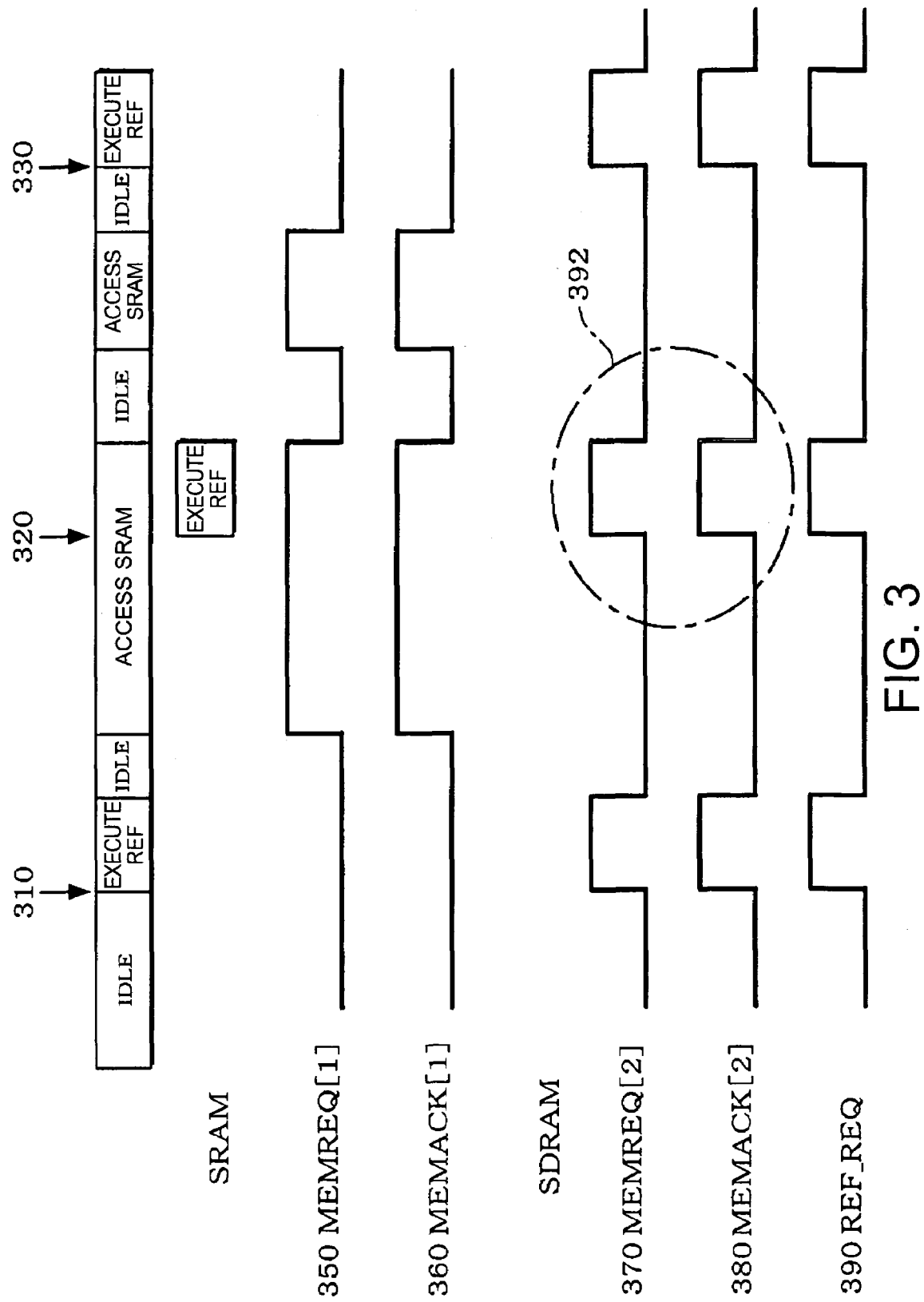
FIG. 3 is a drawing describing the behavior of the arbiter according to the present embodiment.

FIG. 3 is a drawing describing the behavior of the arbiter according to the present embodiment.

A reference numeral 350 is a memory request signal MEMREC (1) to the SRAM, and a reference numeral 360 is an enabling signal MEMACK (1) for the memory request signal MEMREC (1) to the SRAM.

Further, a reference numeral 370 is a memory request signal MEMREC (2) to the SDRAM, and a reference numeral 380 is an enabling signal MEMACK (2) for the memory request signal MEMREC (2) to the SDRAM.

A reference numeral 390 is an auto-refresh request reporting signal REF_REQ that reports to the arbiter that the request is an auto-refresh request.

As shown in 392, when the REF_REQ 390 reaches an H-level and reports to the arbiter that the request is a "bus-right request for executing auto-refresh," the arbiter permits the bus access of the SDRAM controller. Therefore, there is no delay in refresh execution.

Microcomputer

Figure 7:
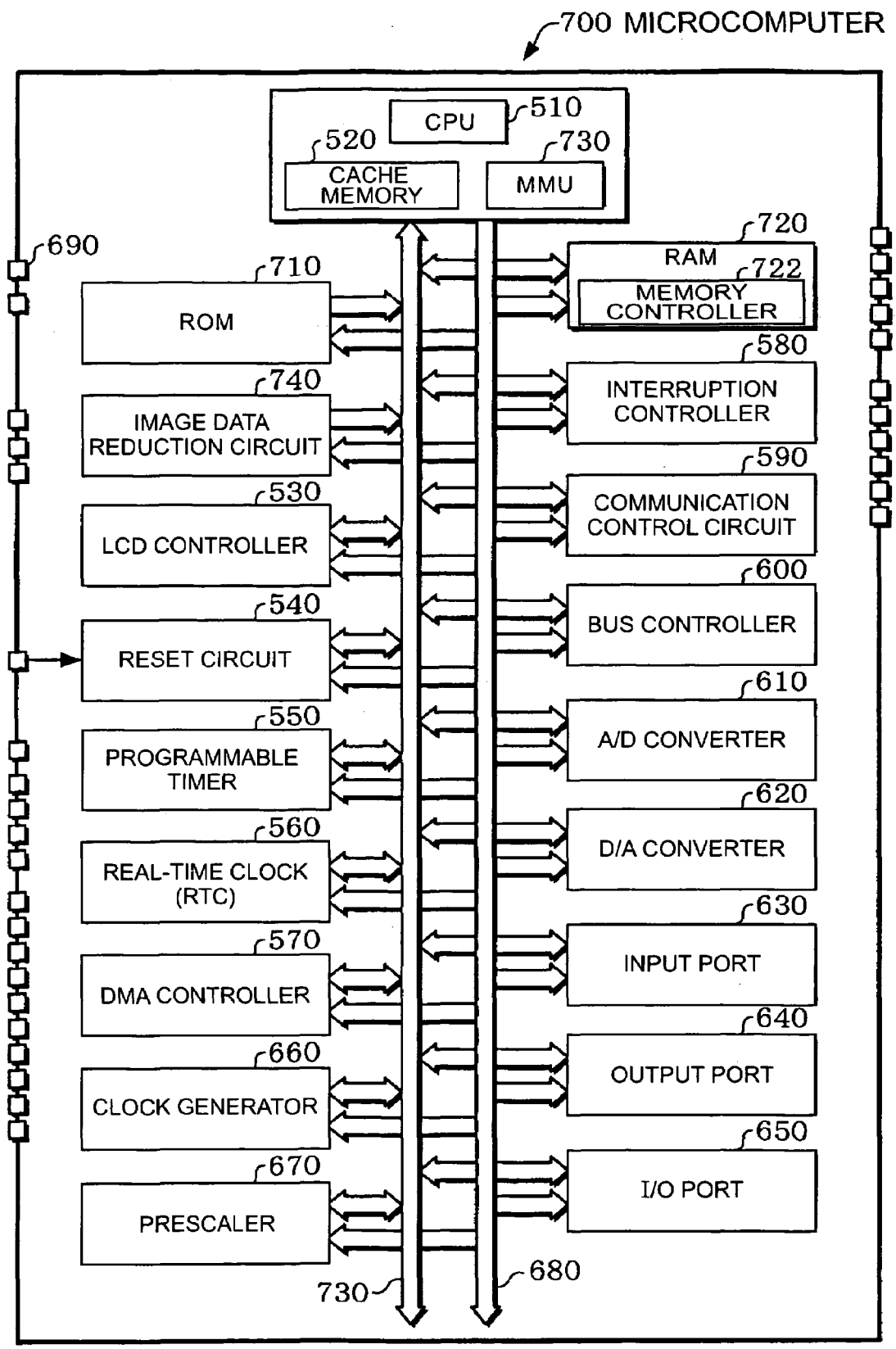
FIG. 7 is an example hardware block diagram of a microcomputer according to the present embodiment.

FIG. 7 is an example hardware block diagram of a microcomputer according to the present embodiment.

A microcomputer 700 comprises a CPU 510, a cache memory 520, an LCD controller 530, a reset circuit 540, a programmable timer 550, a real-time clock (RTC) 560, a DRAM controller-bus I/F 570, an interruption controller 580, a serial interface 590, a bus controller 600, an A/D converter 610, a D/A converter 620, an input port 630, an output port 640, an I/O port 650, a clock generator 660, a prescaler 670, an MMU 730, and an image processing circuit 740; as well as a general-purpose bus 680, an exclusive bus 730, etc. that connects the foregoing components; various pins 690, etc.

A RAM 720 comprises a dynamic random access memory (DRAM/SDRAM) and a memory controller 722 of the present invention.

The memory controller 722 has a configuration described in FIG. 1, for example.

Electronic Device

Figure 8:
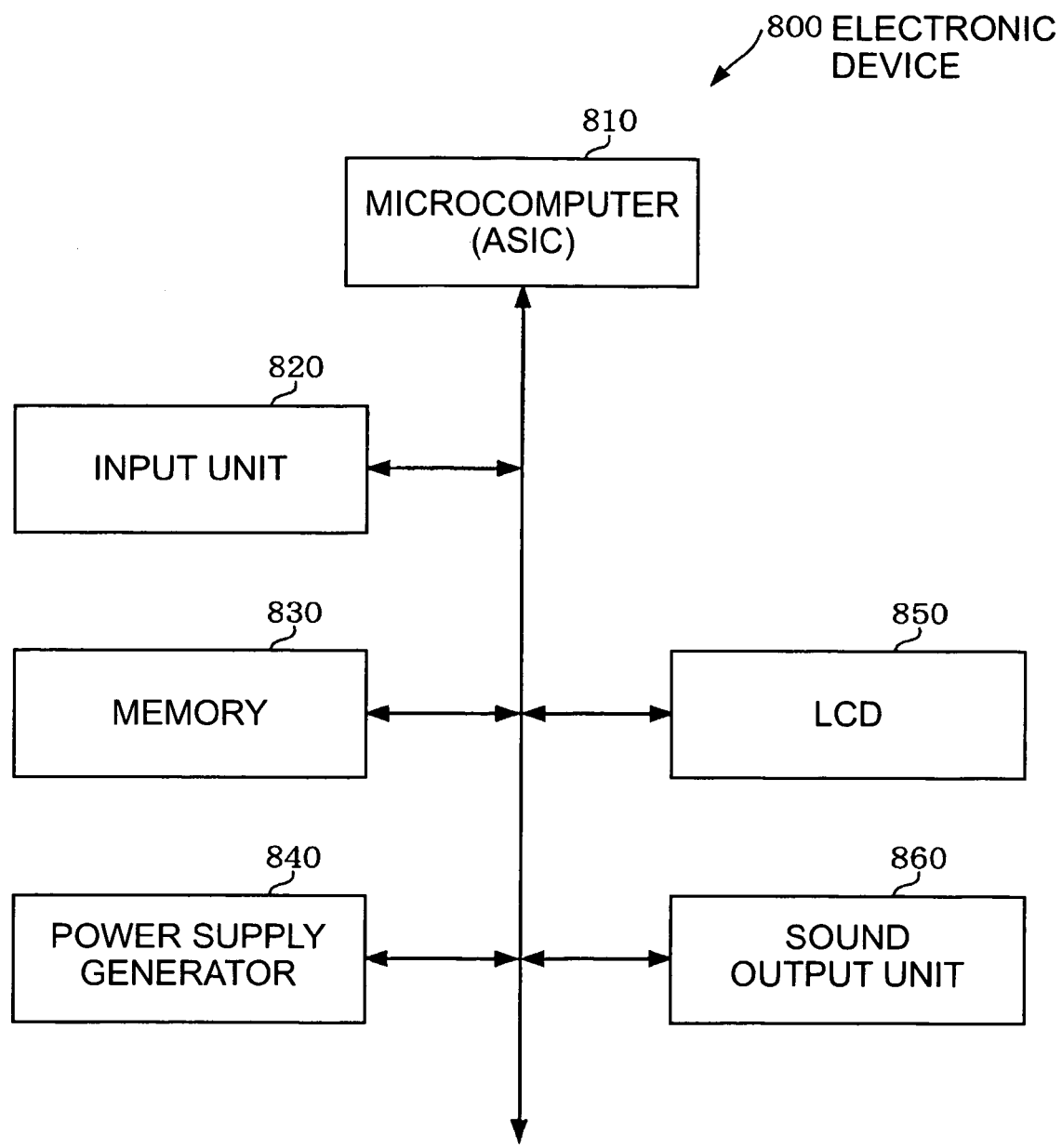
FIG. 8 is an example block diagram of an electronic device according to the present embodiment.

FIG. 8 is an example block diagram of an electronic device according to the present embodiment. An electronic device 800 comprises a microcomputer (or an ASIC) 810, an input unit 820, a memory 830, a power supply generator 840, an LCD 850, and a sound output unit 860.

Here, the input unit 820 is used for inputting various data. The microcomputer 810 is used for conducting various processing based on the data inputted by the input unit 820. The memory 830 becomes a work area of the microcomputer 810, etc. The power supply generator 840 is used for generating various power supplies to be used in the electronic device 800. The LCD 850 is used for outputting various images (characters, icons, graphics, etc.) displayed by the electronic device. The sound output unit 860 is used for outputting various sounds (phonetic sounds, game sounds, etc.), the function of which can be realized using hardware such as speakers, etc.

Figure 9A:
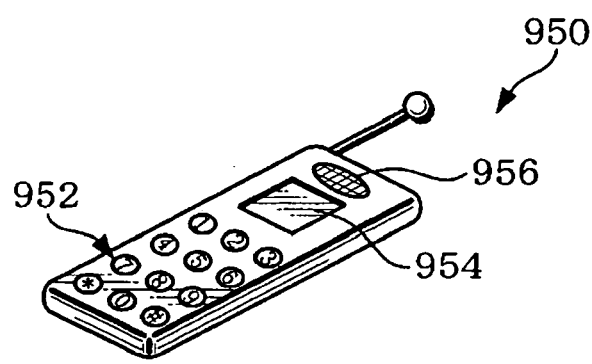
FIGS. 9A, B, and C are example appearances of various electronic devices.

FIG. 9A is an example appearance of a cellular phone 950, which is one of electronic devices. The cellular phone 950 has dial buttons 952 that work as an input unit, an LCD 954 that displays telephone numbers, names, icons, etc., and a speaker 956 that works as a sound output unit and outputs sounds.

Figure 9B:
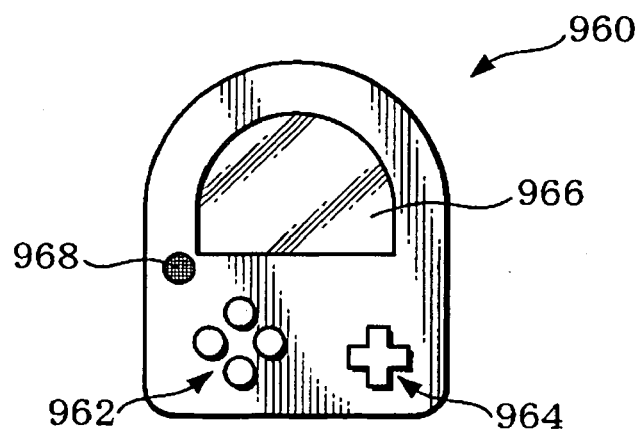

FIG. 9B is an example appearance of a portable gaming device 960, which is one of electronic devices. The gaming device 960 has operation buttons 962 and an arrow key 964 that work as an input unit, an LCD 966 that displays game images, and a speaker 968 that works as a sound output unit and outputs game sounds.

Figure 9C:
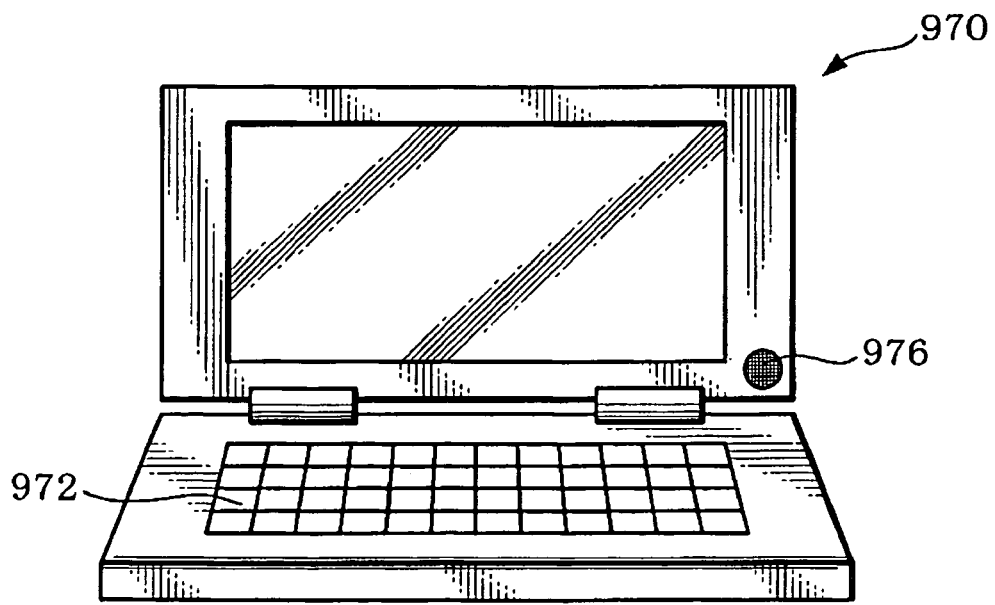

FIG. 9C is an example appearance of a personal computer 970, which is one of electronic devices. The personal computer 970 has a keyboard 972 that works as an input unit, an LCD 974 that displays characters, numerical figures, graphics, etc., and a sound output unit 976.

By incorporating the microcomputer of the present embodiment into the electronic devices shown in FIGS. 9A to 9C, an electronic device with a smaller memory capacity can be provided at a lower cost.

Further, as an electronic device applicable to the present embodiment, there are various electronic devices, other than the ones shown in FIGS. 9A, B, and C, that use an LCD such as: personal digital assistants, pagers, electronic desk calculators, devices having a touch panel, projectors, word processors, videotape recorders with a viewfinder or a direct-view monitor, car navigation devices, etc.

In addition, the present embodiment is not limited to the present invention but can be varied diversely within the scope of the present invention.

For example, the first memory requiring refresh is not limited to an SDRAM, which is taken as an example in the above embodiment. For example, another kind of memory requiring refresh such as DRAM, etc. is also acceptable.

For further example, the second memory not requiring refresh is not limited to an SRAM, which is taken as an example in the above embodiment. For example, another kind of memory not requiring refresh such as ROM, etc. is also acceptable.

For further example, the present invention is not limited to the specification for generating a refresh command with a combination of signals SDRAM_CS, RAS, CAS, and WE, which is taken as an example in the above embodiment. In the case of another specification, for example, a configuration that a bus signal outputting a signal required for making a refresh request by employing the relevant specification is not shared with the second memory is also within the scope of the present invention.

For further example, the present invention is not limited to the configuration wherein the arbiter judges, based on the REF_REQ, whether or not the current request is an auto-refresh request, which is taken as an example in the above embodiment. For example, a configuration wherein the judgment of whether or not the current request is an auto-refresh request is given based on a combination of signals RAS, CAS, and WE that are generated by an SDRAM (the first memory) controller is also acceptable.

For further example, the present invention is not limited to the case where two memories including the first memory requiring refresh and the second memory not requiring refresh share part of a bus, which is taken as an example in the above embodiment. For example, the case where three or more memories including the first memory requiring refresh and the second memory not requiring refresh share a bus is also within the scope of the present invention.

What is claimed is:

1. Memory control apparatus connectable with a first memory which requires refresh, and a second memory which shares part of a bus with the first memory and does not require refresh, the apparatus comprising:
   a first memory controller that conducts access control and auto-refresh control for the first memory;
   a second memory controller that conducts access control for the second memory; and
   an arbiter that adjusts a timing of outputting a signal that is generated for the first memory by the first memory controller and another signal that is generated for the second memory by the second memory controller to a bus that is connected to at least one of the first memory and the second memory,
      the arbiter judging whether a signal from the first memory controller is an auto-refresh request signal
      the memory controllers communicating with the first and second memories by a plurality of bus signals;
      the plurality of bus signals including: a plurality of first bus signals that control a first process by which the first memory controller accesses the first memory;
      a plurality of second bus signals that control a second process by which the second memory controller accesses the second memory; and
      a plurality of third bus signals that are shared by the first and second memories, the plurality of third bus signals including a data bus signal and an address bus signal,
   the first process including a refresh request from the first memory controller to the first memory, and
   the first memory being refreshed during access of the second memory.

2. The memory controller according to claim 1, wherein the first memory controller operates independent of the second memory controller.

3. A memory controller connectable with a plurality of memories that include a first memory that requires refresh and a second memory that does not require refresh,
   the memory controller communicating with the plurality of memories by a plurality of bus signals, the plurality of bus signals including:
   a plurality of first bus signals that control a first process by which the memory controller accesses the first memory;
   a plurality of second bus signals that control a second process by which the memory controller accesses the second memory; and
   a plurality of third bus signals that are shared by the plurality of memories, the third bus signals including a data bus signal and an address bus signal,
   the first process including a refresh request from the memory controller to the first memory, and
   the first memory being refreshed during access of the second memory.

4. The memory controller according to claim 3, wherein the plurality of first bus signals are not shared with the second memory.

5. The memory controller according to claim 3, wherein the plurality of first bus signals comprise: a chip select signal; a row address strobe (RAS) signal; a column address strobe (CAS) signal; and a write enable (WE) signal.

6. A semiconductor integrated circuit device comprising the memory controller according to claim 3.

7. A semiconductor device comprising: the memory controller according to claim 3; a first memory; and a second memory.

8. A microcomputer comprising the memory controller according to claim 3.

9. An electronic device comprising: the microcomputer according to claim 8; a first unit that inputs first data signals to the microcomputer; and a second unit that outputs second data signals generated by the microcomputer based on the first data signals.

10. The memory controller according to claim 3, wherein the first memory includes synchronous DRAM.

11. The memory controller according to claim 3, wherein the plurality of memories comprises synchronous DRAM, and wherein the synchronous DRAM is refreshed based on the plurality of first bus signals.

12. A memory controller connectable with a plurality of memories that include a first memory that requires refresh and a second memory that does not require refresh, the memory controller communicating with the plurality of memories by a plurality of bus signals, the plurality of bus signals including: a plurality of first bus signals that are used for communication between the first memory and the memory controller; a plurality of second bus signals that are used for communication between the second memory and the memory controller; and a plurality of third bus signals that are used for communication between the plurality of memories and the memory controller, the plurality of first and third bus signals controlling a first process by which the memory controller accesses the first memory, the third bus signal including a data bus signal and an address bus signal;

the plurality of second and third bus signals controlling a second process by which the memory controller accesses the second memory, and the first memory being refreshed during the second process based on the plurality of first bus signals.

* * * * *